(12) United States Patent
Nakamura

(10) Patent No.: US 9,292,395 B2
(45) Date of Patent: Mar. 22, 2016

(54) DEBUG STUB SERVER, DEBUG METHOD, AND PROGRAM

(75) Inventor: Yuichi Nakamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 183 days.

(21) Appl. No.: 13/992,539

(22) PCT Filed: Dec. 7, 2011

(86) PCT No.: PCT/JP2011/078272
§ 371 (c)(1),
(2), (4) Date: Jun. 7, 2013

(87) PCT Pub. No.: WO2012/077704
PCT Pub. Date: Jun. 14, 2012

(65) Prior Publication Data
US 2013/0262930 A1 Oct. 3, 2013

(30) Foreign Application Priority Data

Dec. 7, 2010 (JP) ................................. 2010-272840

(51) Int. Cl.
*G06F 11/00* (2006.01)
*G06F 11/22* (2006.01)
*G06F 11/36* (2006.01)

(52) U.S. Cl.
CPC ........ *G06F 11/2268* (2013.01); *G06F 11/3664* (2013.01)

(58) Field of Classification Search
CPC ... G06F 17/142; G06F 15/17381; G06F 9/52; H04L 12/1813
USPC ................................ 714/38.14; 709/204, 249
See application file for complete search history.

(56) References Cited

U.S. PATENT DOCUMENTS 6,058,393 A * 5/2000 Meier et al. .................... 717/124
6,324,683 B1 * 11/2001 Fuh et al. ....................... 717/124
6,425,101 B1 7/2002 Garreau
(Continued)

FOREIGN PATENT DOCUMENTS

| JP | 4-326844 A | 11/1992 |
| JP | 6-103105 A | 4/1994 |

(Continued)

OTHER PUBLICATIONS

Jonathan B. Rosenberg, "How Debuggers Work: Algorithms, Data Structures, and Architecture," translated by Kunio Yoshikawa, ASCII, 1998, pp. 41-53, Concise English language explanation provided in Applicant's specification beginning at paragraph [0002].

(Continued)

*Primary Examiner* — Bryce Bonzo
*Assistant Examiner* — Jeison C Arcos

(57) ABSTRACT

A debug stub server comprises: an arbitration unit that receives a plurality of control instructions given to a debug program from a plurality of information terminals, selects a simultaneously executable control instruction set from among the plurality of control instructions by arbitrating the plurality of control instructions, and forwards the selected control instruction set to the debug program; and a forwarding unit that forwards a debug result obtained by the debug program based on the control instruction set selected by the arbitration unit to the plurality of information terminals.

12 Claims, 11 Drawing Sheets

(56) References Cited

U.S. PATENT DOCUMENTS

| | | | |
|---|---|---|---|
| 6,684,343 B1* | 1/2004 | Bouchier et al. | 714/4.12 |
| 6,918,052 B2* | 7/2005 | Bouchier et al. | 714/4.3 |
| 7,003,698 B2* | 2/2006 | Glass | 714/30 |
| 7,606,750 B1* | 10/2009 | Hoag et al. | 705/35 |
| 7,760,769 B1* | 7/2010 | Lovett et al. | 370/542 |
| 2004/0103218 A1* | 5/2004 | Blumrich et al. | 709/249 |
| 2004/0205266 A1* | 10/2004 | Regal et al. | 710/29 |
| 2005/0157709 A1* | 7/2005 | Lin | 370/362 |
| 2009/0037775 A1* | 2/2009 | Chi et al. | 714/38 |
| 2010/0192015 A1 | 7/2010 | Dressler et al. | |
| 2014/0185451 A1* | 7/2014 | Yip et al. | 370/236 |

FOREIGN PATENT DOCUMENTS

| | | |
|---|---|---|
| JP | 11-184729 A | 7/1999 |
| JP | 2000-148528 A | 5/2000 |
| JP | 2001-51871 A | 2/2001 |
| JP | 2004-21751 A | 1/2004 |
| JP | 2006139346 A | 6/2006 |
| JP | 2010-117810 A | 5/2010 |
| JP | 2010-173633 A | 8/2010 |

OTHER PUBLICATIONS

"gdbserver," [online], [searched on Oct. 1, 2010], Internet <URL:http://ftp.gnu.org/old-gnu/Manuals/gdb-5.1.1/html_node/gdb_130.html>. Cited in Applicant's specification beginning at paragraph [0002].

International Search Report for PCT Application No. PCT/JP2011/078272 mailed on Jan. 17, 2012.

Japanese Office Action for JP Application No. 2012-547887 mailed on Nov. 17, 2015 with English Translation.

* cited by examiner

DEBUG STUB SERVER, DEBUG METHOD, AND PROGRAM

TECHNICAL FIELD

1. Reference to Related Application

The present application is a National Stage Entry of PCT/JP2011/078272 filed Dec. 7, 2011, which is based on and claims the benefit of the priority of Japanese Patent Application No. 2010-272840 filed on Dec. 7, 2010, the disclosures of all of which are incorporated herein in their entirety by reference. The present invention relates to a debug stub server, a debug method, and a program. In particular, it relates to a debug stub server, a debug method, and a program for achieving debugging from a plurality of information terminals.

2. Background

Non patent literatures (NPLs) 1 and 2 and patent literatures (PTLs) 1 and 2 disclose a debug system. FIG. 10 is a block diagram schematically illustrating a configuration of a debug system disclosed in these literatures. With reference to FIG. 10, the debug system includes a debug target apparatus 210 and an information terminal 220 used by an operator executing debugging. The debug system is configured so that the debug target apparatus 210 and the information terminal 220 are arranged on a one-on-one basis. There are cases where the debug system includes a plurality of debug target apparatus 210 or a plurality of processes.

The debug system disclosed in NPL 1 includes a single debug target apparatus 210 and a single information terminal 220 that are arranged on a one-on-one basis and includes a screen that can display an internal state of the debug target apparatus 210 and that can control stopping and restarting of execution of a program on the debug target apparatus 210. With this debug system, based on these control operations, an operator can detect program errors or hardware errors and repair such errors while the screen displays the internal state of the debug target apparatus 210.

In NPL 1, the debug target apparatus 210 and the information terminal 220 are implemented on the same computer. In contrast, in NPL 2, a debug function exists on the debug target apparatus 210, and a debug operation is remotely executed from the externally-connected information terminal 220. Thus, since the debug function is built in a server on the debug target apparatus 210, a debug function other than previously built-in functions cannot be executed.

FIG. 11 is a block diagram illustrating a configuration of a debug system disclosed in PTL 1. This debug system is a test apparatus for a plurality of JTAG (Joint Test Action Group)-based integrated circuits and is a test system for testing a plurality of integrated circuits. With reference to FIG. 11, the test system includes a master controller 102 that can operate to execute a test protocol corresponding to each of the integrated circuits that include on-chip debug programs. The test system also includes a programmable switch (not illustrated) that selectively forms a test loop between the master controller 102 and a selected integrated circuit, so that the master controller 102 can give an instruction in accordance with configuration data. The test loop enables execution of a selected test protocol, and a data bus for connecting each of the integrated circuits to the master controller 102 is arranged.

Likewise, a method and an operation unit for adjusting a control apparatus in PTL 2 handle a plurality of integrated circuits or processes. In PTL 2, a plurality of processes are buffered by using a memory, and by reading the buffer in serial, information about the plurality of processes is provided to the outside.

In addition, PTL 3 discloses a debugging processing apparatus that enables debugging by a plurality of terminals or tasks in environments separate from each other when programs using inter-task shared routines are simultaneously debugged in parallel, for example, by using an on-line program using an inter-task shared routine or the like.

[PTL 1]
Japanese Patent Kokai Publication No. JP2000-148528A (FIG. 1)
[PTL 2]
Japanese Patent Kokai Publication No. JP2010-173633A
[PTL 3]
Japanese Patent Kokai Publication No. JP-H6-103105A
[NPL 1]
Jonathan B. Rosenberg, "How Debuggers Work: Algorithms, Data Structures, and Architecture," translated by Kunio Yoshikawa, ASCII, 1998, p.42-52.
[NPL 2]
"gdbserver," [online], [searched on Oct. 1, 2010], Internet <URL:http://ftp.gnu.org/old-gnu/Manuals/gdb-5.1.1/html_node/gdb_13 0.html>

SUMMARY

The entire disclosures of the above PTLs and NPLs are incorporated herein by reference thereto. The following analysis has been made by the present inventor.

For a complex system or an apparatus in which a plurality of processes simultaneously operate, a plurality of processes need to be actually executed simultaneously to test and debug the processes. For example, if a single system is shared by a plurality of users and debugging is executed, the users need to share debugging information and simultaneously browse debug screens from a plurality of information terminals. In addition, control operations instructed from a plurality of information terminals, such as setting of breakpoints and execution of steps, need to be exclusively executed.

However, in the above debug systems, the debug state cannot be monitored from a plurality of information terminals. In addition, if control instructions from a plurality of information terminals compete against each other, debugging cannot be executed compatibly.

In particular, in the above debug systems, a plurality of information terminals cannot simultaneously display debug information. This is because debugging by a single information terminal is assumed in the above debug systems.

In addition, in the above debug systems, debug control cannot be simultaneously executed from a plurality of information terminals. Thus, if control instructions are given from a plurality of information terminals, inconsistency or an uncontrollable state could be caused.

In addition, the debugging processing apparatus disclosed in PTL 3 arbitrates instructions from a plurality of information terminals and provides a separate debugging environment for each of the plurality of information terminals. Namely, depending on an instruction from each information terminal, the debugging processing apparatus disclosed in PTL 3 outputs a separate debug result to each information terminal. In this case, since no debug result can be shared among the plurality of information terminals, a debug result based on an instruction from one information terminal cannot be grasped by the other information terminals.

Therefore, there is a need in the art to enable a plurality of information terminals to a share debug result obtained by a debug program based on control instructions separately given from the plurality of information terminals.

According to a first aspect of the present invention, there is provided a debug stub server, comprising:
an arbitration unit that receives a plurality of control instructions given to a debug program from a plurality of information terminals, selects a simultaneously executable control instruction set from among the plurality of control instructions by arbitrating the plurality of control instructions, and forwarding the selected control instruction set to the debug program; and
a forwarding unit that forwards a debug result obtained by the debug program based on the control instruction set selected by the arbitration unit to the plurality of information terminals.

According to a second aspect of the present invention, there is provided a debug method, comprising:
by a debug stub server, receiving a plurality of control instructions given to a debug program from a plurality of information terminals; selecting a simultaneously executable control instruction set from among the plurality of control instructions by arbitrating the plurality of control instructions;
forwarding the selected control instruction set to the debug program; and
forwarding a debug result obtained by the debug program based on the selected control instruction set to the plurality of information terminals.

According to a third aspect of the present invention, there is provided a program, causing a computer to execute:
receiving a plurality of control instructions given to a debug program from a plurality of information terminals;
selecting a simultaneously executable control instruction set from among the plurality of control instructions by arbitrating the plurality of control instructions;
forwarding the selected control instruction set to the debug program; and
forwarding a debug result obtained by the debug program based on the selected control instruction set to the plurality of information terminals.

The present invention provides the following advantage, but not restricted thereto. With the debug stub server, the debug method, and the program according to the present invention, a plurality of information terminals can share a debug result obtained by a debug program based on control instructions separately given from the plurality of information terminals.

PREFERRED MODES

Figure 1:
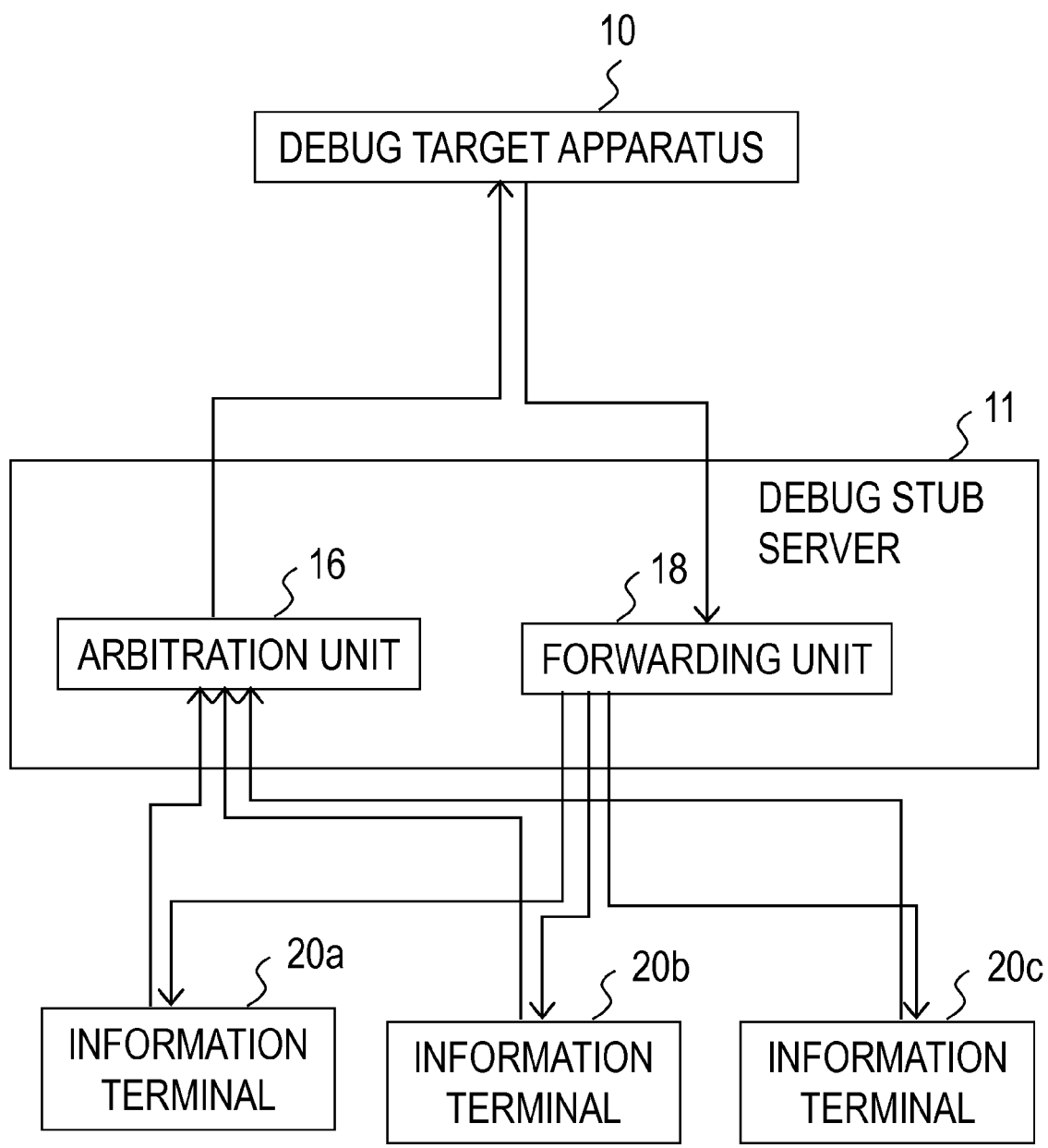
FIG. 1 is a block diagram illustrating an overall configuration of a debug stub server according to an exemplary embodiment.

In the present disclosure, there are various possible modes, which include the following, but not restricted thereto. First, an outline of an exemplary embodiment will be described. However, the reference characters in the following outline are merely used as examples to facilitate understanding of the exemplary embodiment. Therefore, the reference characters are not intended to limit the exemplary embodiment to the illustrated modes.

With reference to FIG. 1, a debug stub server (11) includes a control mechanism for enabling debugging by a plurality of information terminals (20a to 20c). The debug stub server (11) is arranged between a debug target apparatus (10) executing a debug program and the plurality of information terminals (20a to 20c). In addition, the debug stub server (11) and the information terminals (20a to 20c) are connected to each other via a network such as TCP-IP (Transmission Control Protocol-Internet Protocol), USB (Universal Serial Bus), or serial communication, for example. By separating the debug stub server (11) near the debug target apparatus (10) from the information terminals (20a to 20c) in this way, the present invention achieves debugging by a plurality of information terminals. The debug stub server (11) comprehensively executes various operations such as setting of breakpoints and execution of steps with respect to a debug program executed on the debug target apparatus (10), gives instructions for analyzing performance quality information such as collection of profiles or coverages, and displays results.

With reference to FIG. 1, the debug stub server (11) comprises an arbitration unit (16) and a forwarding unit (18). The arbitration unit (16) receives a plurality of control instructions given to a debug program from a plurality of information terminals, selects a simultaneously executable control instruction set from among the plurality of control instructions by arbitrating the plurality of control instructions, and forwards the selected control instruction set to the debug program. The forwarding unit (18) forwards debug results obtained by the debug program based on the control instruction set selected by the arbitration unit (16) to the plurality of information terminals.

The arbitration unit (16) may notify an information terminal that has transmitted a control instruction that has not been selected by the arbitration from among the plurality of control instructions that the control instruction has not been selected. In addition, the arbitration unit (16) may arbitrate a plurality of received control instructions by referring to a control condition library that stores a rule for arbitrating the plurality of control instructions given to the debug program. In addition, the arbitration unit (16) may arbitrate the plurality of control instructions given to the debug program based on at least one of priorities of the control instructions, numbers given to the information terminals that have transmitted the control instructions, and an order in which the arbitration unit has received the control instructions.

The debug stub server according to the present invention can enable a plurality of information terminals to share debug results obtained by a debug program based on control instructions separately given from the plurality of information terminals. This is because the debug stub server forwards simultaneously executable control instructions selected from among a plurality of control instructions supplied from a plurality of information terminals to a debug program and transmits debug results obtained by the debug program based on the simultaneously executable control instructions to a plurality of information terminals.

In addition, the debug stub server according to the present invention can supply debug information to a plurality of information terminals. This is because the debug stub server first organizes the debug information before providing the information to the information terminals.

In addition, with the debug stub server according to the present invention, debug control can be executed simultaneously from a plurality of information terminals. This is because the debug stub server executes exclusive control based on a control condition library.

In addition, with the debug stub server according to the present invention, a debug screen of each information terminal can be configured arbitrarily. This is because, since the debug stub server forwards debug information alone, not a debug screen, each information terminal can arbitrarily configure a debug screen.

In addition, according to the present invention, the following modes are possible.
(Mode 1)
A debug stub server may be the debug stub server according to the above first aspect.
(Mode 2)
The arbitration unit may notify an information terminal that has transmitted a control instruction that has not been selected by the arbitration from among the plurality of control instructions that the control instruction has not been selected.
(Mode 3)
The arbitration unit may arbitrate a plurality of received control instructions by referring to a control condition library that stores a rule for arbitrating the plurality of control instructions given to the debug program.
(Mode 4)
The arbitration unit may arbitrate the plurality of control instructions given to the debug program based on at least one of priorities of the control instructions, numbers given to the information terminals that have transmitted the control instructions, and an order in which the arbitration unit has received the control instructions.
(Mode 5)
A debug system may comprise: the above debug stub server; and a plurality of information terminals each of which is configured to transmit a control instruction given to the debug program from a user to the debug stub server and display a debug result forwarded from the debug stub server.
(Mode 6)
The debug stub server may be arranged in a debug target apparatus executing the debug program or one of the plurality of information terminals.
(Mode 7)
Each of the plurality of information terminals may comprise: a display method library that stores a method for displaying a debug result; and a display instruction unit that displays the debug result based on the display method stored in the display method library.
(Mode 8)
A debug method may be the debug method according to the above second aspect.
(Mode 9)
The above debug method may comprise: by the debug stub server, notifying an information terminal that has transmitted a control instruction that has not been selected by the arbitration from among the plurality of control instructions that the control instruction has not been selected.
(Mode 10)
In the debug method according to the above mode, the debug stub server may arbitrate a plurality of received control instructions by referring to a control condition library that stores a rule for arbitrating the plurality of control instructions given to the debug program.
(Mode 11)
In the debug method according to the above mode, the debug stub server may arbitrate the plurality of control instructions given to the debug program based on at least one of priorities of the control instructions, numbers given to the information terminals that have transmitted the control instructions, and an order in which the debug stub server has received the control instructions.
(Mode 12)
A program may be the program according to the above third aspect. The program can be recorded in a non-transient computer-readable recording medium and can be embodied as a recording medium.
(Mode 13)
The program according to the above mode may cause the computer to execute: notifying an information terminal that has transmitted a control instruction that has not been selected by the arbitration from among the plurality of control instructions that the control instruction has not been selected.
(Mode 14)
The program according to the above mode may cause the computer to execute: arbitrating a plurality of received control instructions by referring to a control condition library that stores a rule for arbitrating the plurality of control instructions given to the debug program.
(Mode 15)
The program according to the above mode may cause the computer to execute: arbitrating the plurality of control instructions given to the debug program based on at least one of priorities of the control instructions, numbers given to the information terminals that have transmitted the control instructions, and an order in which the debug stub server has received the control instructions.

FIRST EXEMPLARY EMBODIMENT

A debug system according to a first exemplary embodiment will be described with reference to the drawings.

Figure 2:
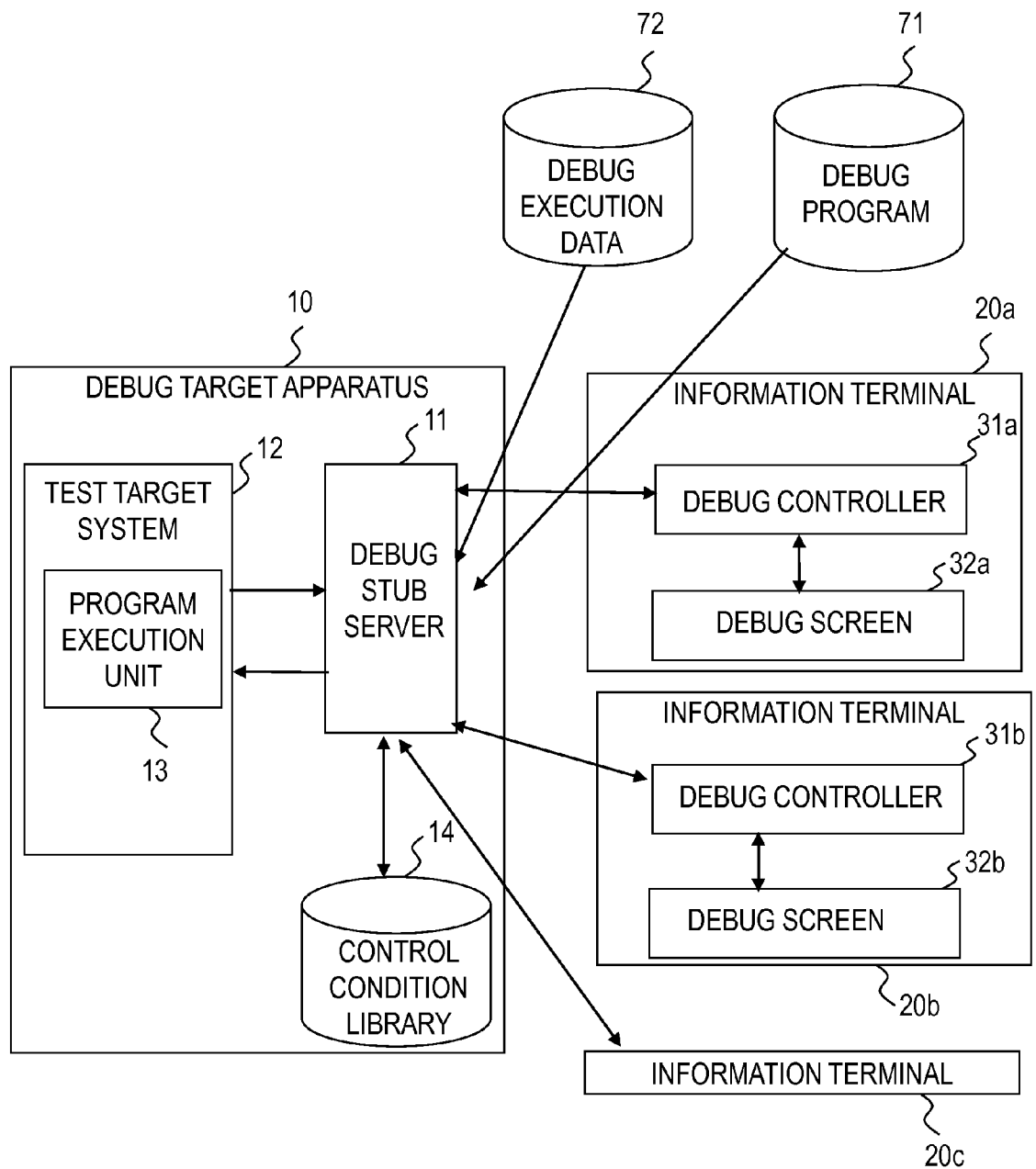
FIG. 2 is a block diagram illustrating a configuration of a debug system according to a first exemplary embodiment.

FIG. 2 is a block diagram illustrating a configuration of a debug system according to the present exemplary embodiment. With reference to FIG. 2, the debug system includes a debug target apparatus 10 as an apparatus to be tested and a plurality of information terminals 20a to 20c. In FIG. 2, three information terminals are illustrated as an example. However, the number of information terminals is not limited to such example.

The debug target apparatus 10 includes a debug stub server 11, a test target system 12, and a control condition library 14.

A program execution unit 13 is arranged in the test target system 12 and is started separately from the debug stub server 11. The information terminals 20a to 20c include debug controllers 31a to 31c and debug screens 32a to 32c, respectively. In addition, the debug system includes a debug program 71 and debug execution data 72.

The debug stub server 11 is connected to the debug controllers 31a to 31c of the respective information terminals 20a to 20c via Ethernet, USB (Universal Serial Bus), or serial communication, for example. The debug stub server 11 receives a debug program and data from the program execution unit 13 of the test target system 12 executing debugging and analyzing and executes debugging and analyzing on the debug program and the data based on instructions from the information terminals 20a to 20c. The debug stub server 11 transmits debug or analysis results to the debug screens 32a to 32c of the information terminals 20a to 20c via the debug controllers 31a to 31c.

When receiving control instructions such as stopping, step, information acquisition from the debug controllers 31a to 31c, the debug stub server 11 operates in accordance with a control condition described in the control condition library 14. If the debug stub server 11 receives exclusive control instructions that compete against each other, the debug stub server 11 determines executable control instructions and executes the determined control instructions. In addition, the debug stub server 11 notifies the debug screens 32a to 32c of the inexecutable control instructions via the debug controllers 31a to 31c.

The program execution unit 13 starts a debug analysis program, such as for debugging, coverage acquisition, automatic testing, memory management, or profile acquisition. The program execution unit 13 operates based on instructions from the debug stub server 11 and transmits results to the debug stub server 11.

The debug controllers 31a to 31c generate the debug program 71 and the debug execution data 72 and forward the program 71 and data 72 to the debug stub server 11. In addition, for example, the debug controllers 31a to 31c control the start, end, and stop of debugging, give display instructions, and specify stop positions. In addition, the debug controllers 31a to 31c cause the debug screens 32a to 32c to display various information.

The debug screens 32a to 32c display debug information received from the debug stub server 11 via the debug controllers 31a to 31c, debug instruction buttons, command input screens, and source codes. In addition, the debug screens 32a to 32c display information so that a stop position in a source code can be specified.

The control condition library 14 stores an arbitration rule used when a plurality of instructions that cannot be simultaneously executed are received, for example, when similar instructions are simultaneously received from the plurality of information terminals 20a to 20c. The debug stub server 11 refers to the control condition library 14 and executes exclusive control on a plurality of instructions.

The debug program 71 and the debug execution data 72 are a program and execution data therefor that are created for being executed and for debugging in the debug target apparatus 10. The debug program 71 and the debug execution data 72 are compiled for the test target system.

Figure 3:
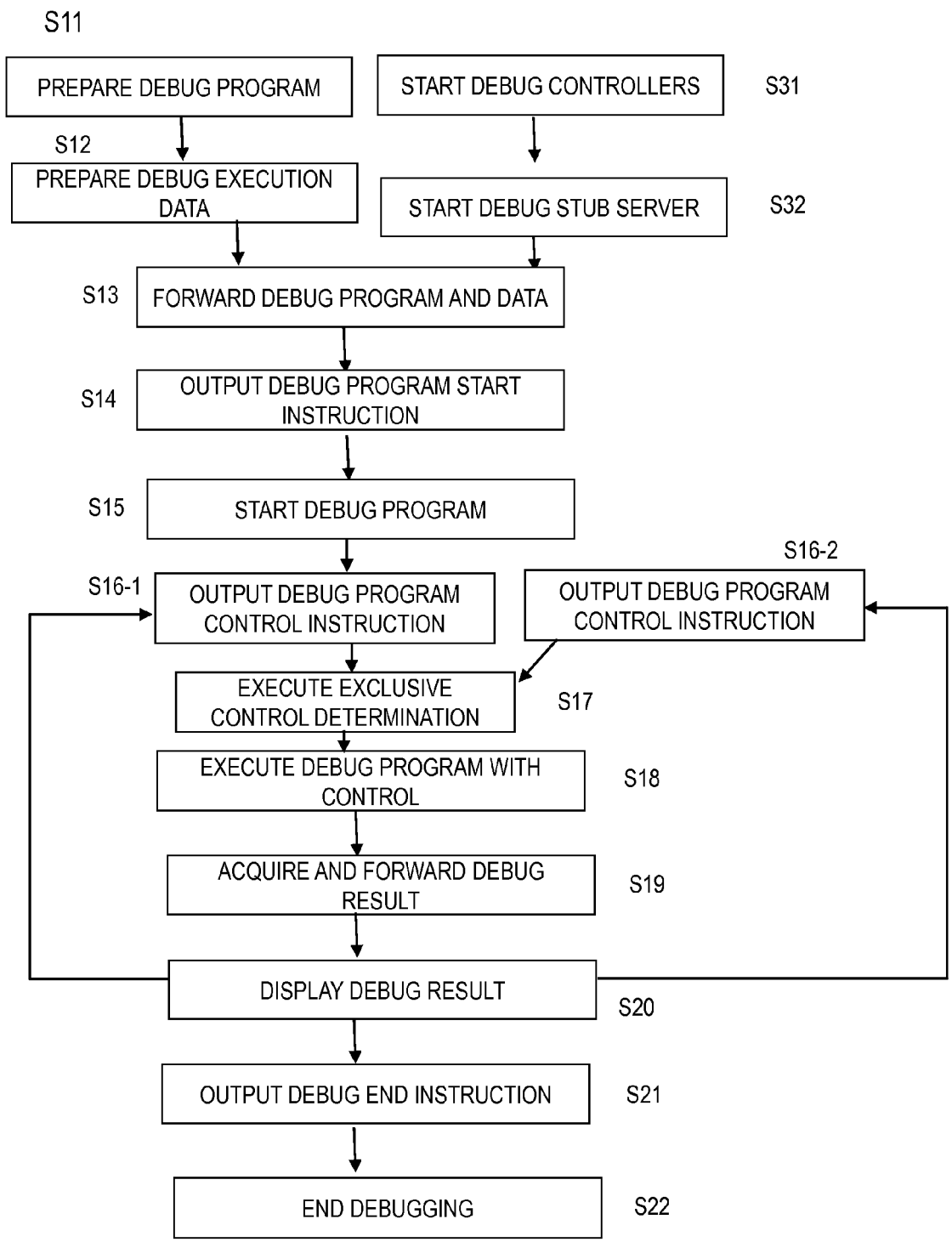
FIG. 3 is a flow chart illustrating an operation of the debug system according to the first exemplary embodiment.
Figure 4:
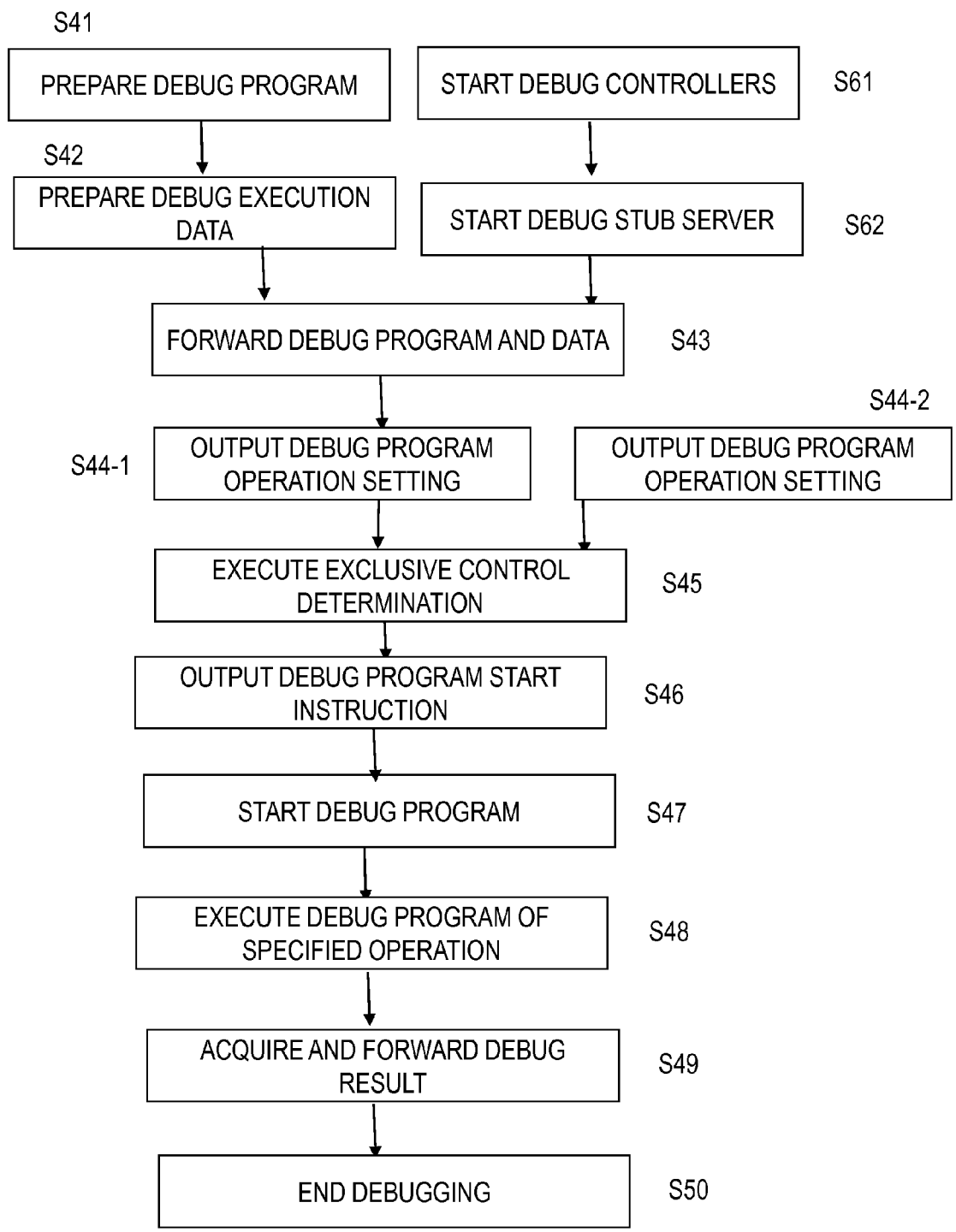
FIG. 4 is a flow chart illustrating an operation of the debug system according to the first exemplary embodiment.

FIGS. 3 and 4 are flow charts illustrating operations of the debug system according to the present exemplary embodiment. Operations of the debug system as a whole according to the present exemplary embodiment will be described with reference to FIGS. 2 to 4.

First, a case where control instructions are issued from a plurality of information terminals during an operation will be described with reference to the flow chart illustrated in FIG. 3.

The information terminals 20a to 20c or other systems generate a debug program created for grasping an internal state or a debug program created for executing analysis as the debug program 71 executable in the test target system 12 of the debug target apparatus 10 (step S11). These debug programs are generated by setting compile options or executing other programs during or after compiling.

In addition, the debug execution data 72 is prepared as data for executing debugging or analysis (step S12).

In parallel with steps S11 and S12, the debug controllers 31a to 31c and the debug screens 32a to 32c are started (step S31).

The debug stub server 11 is started on the debug target apparatus 10, and connection between the debug stub server 11 and the plurality of the debug controllers 31a to 31c are established via communication means such as Ethernet, USB, PCI, or serial communication (step S32).

By using the network established in step S32, the debug program 71 and the debug execution data 72 prepared in steps S11 and S12 are forwarded to the program execution unit 13 via the debug stub server 11 (step S13).

An instruction for starting the debug program 71 is outputted from any one of the debug controllers 31a to 31c (step S14), and the debug program 71 is started (step S15).

After the debug program 71 is started, instructions for a program stop position and change of the amount or the type of acquired information are specified on the debug screens 32a to 32c, and the instructions are outputted from the debug controllers 31a to 31c (step S16-1, S16-2).

The debug stub server 11 queries the control condition library 14 in which a control condition is previously set and executes control instructions matching the control condition. The debug stub server 11 displays the inexecutable control operations on the debug screens 32a to 32c via the respective debug controllers 31a to 31c that have outputted the respective control instructions (step S17).

With executable control, data is inserted from the program execution unit 13 to the debug program 71 and the data is executed (step S18). Next, debug results are acquired and forwarded (step S19).

The results acquired in step S19 are displayed on the debug screens 32a to 32c via the program execution unit 13, the debug stub server 11, and the debug controllers 31a to 31c, based on display methods specified by the respective debug controllers 31a to 31c (step S20).

Depending on the displayed results, if debugging is executed, the operation returns to steps S16-1 and S16-2, and control is executed by changing the condition again.

If debugging is ended, end instructions are outputted from the debug screens 32a to 32c (step S21). When the debug stub server 11 receives the end instructions, debugging is ended (step S22).

Next, a case where control instructions are issued from a plurality of information terminals before an operation will be described with reference to the flow chart illustrated in FIG. 4.

The information terminals 20a to 20c or other systems generate a debug program created for grasping an internal state or a debug program created for executing analysis as the debug program 71 executable in the test target system 12 of the debug target apparatus 10 (step S41). These debug programs are generated by setting compile options or executing other programs during or after compiling.

In addition, the debug execution data 72 is prepared as data for executing debugging or analysis (step S42).

In parallel with steps S41 and S42, the debug controllers 31a to 31c and the debug screens 32a to 32c are started (step S61).

The debug stub server 11 is started on the debug target apparatus 10, and connection between the debug stub server 11 and the plurality of the debug controllers 31a to 31c are established via communication means such as Ethernet, USB, PCI, or serial communication (step S62).

By using the network established in step S62, the debug program 71 and the debug execution data 72 prepared in steps S41 and S42 are forwarded to the program execution unit 13 via the debug stub server 11 (step S43).

Next, a debug program execution condition is specified (steps S44-1 and S44-2).

The debug stub server 11 queries a control condition stored in the control condition library 14 and sets an execution condition. The debug stub server 11 displays the inexecutable control operations on the debug screens 32a to 32c via the respective debug controllers 31a to 31c that have outputted the respective control instructions (step S45).

With executable control, start of the debug program 71 is specified (step S46), and the debug program 71 is started (step S47).

Data is inserted from the program execution unit 13 to the debug program 71, and the debug program 71 is executed (step S48).

The result acquired in step S48 is displayed on the debug screens 32a to 32c via the program execution unit 13, the debug stub server 11, and the debug controllers 31a to 31c, based on display methods specified by the respective debug controllers 31a to 31c (step S49).

End instructions are outputted from the debug screens 32a to 32c, and when the debug stub server 11 receives the outputted end instructions, debugging is ended (step S50).

If a plurality of control instructions are supplied both before and during an operation, a combination of the above two operations is executed.

SECOND EXEMPLARY EMBODIMENT

A debug system according to a second exemplary embodiment will be described with reference to the drawings.

Figure 5:
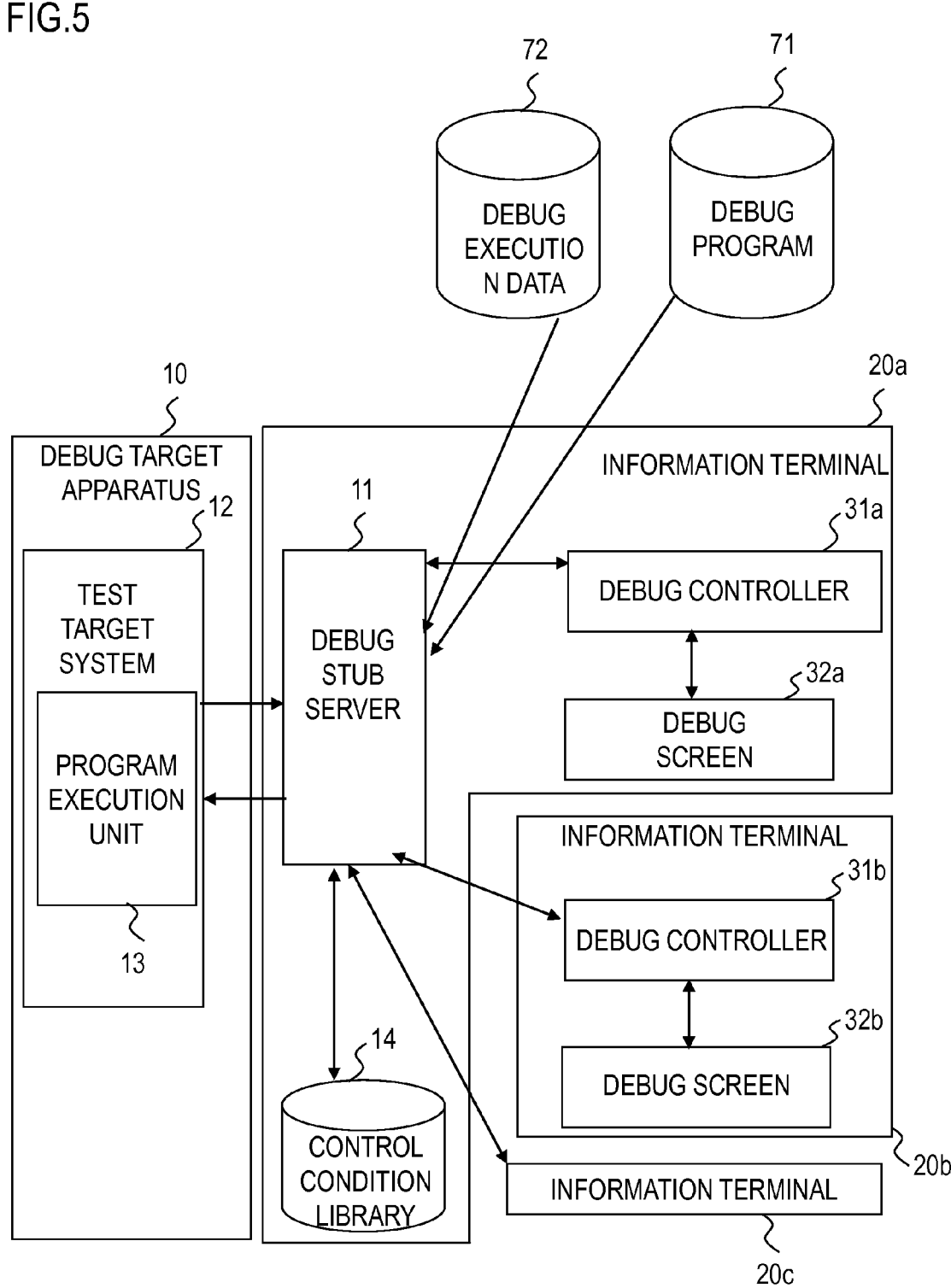
FIG. 5 is a block diagram illustrating a configuration of a debug system according to a second exemplary embodiment.

FIG. 5 is a block diagram illustrating a configuration of a debug system according to the present exemplary embodiment. With reference to FIG. 5, the debug system includes a debug target apparatus 10 as an apparatus to be tested and a plurality of information terminals 20a to 20c. In FIG. 5, three information terminals are illustrated as an example. However, the number of information terminals is not limited to such example.

In the first exemplary embodiment, the debug stub server 11 is arranged on the debug target apparatus 10 (FIG. 2). In contrast, the debug stub server 11 according to the present exemplary embodiment is arranged on the information terminal 20a. Since each unit illustrated in FIG. 5 operates in a similar way to that according to the first exemplary embodiment, description thereof will be omitted.

As in the present exemplary embodiment, the debug stub server 11 may be arranged on any one of the information terminals 20a to 20c. If the debug system has a certain communication means between the debug stub server 11 and the program execution unit 13, the debug stub server 11 may be arranged on a different apparatus other than the debug target apparatus 10 and the information terminals 20a to 20c. The debug system according to the present exemplary embodiment can achieve operations similar to those of the debug system according to the first exemplary embodiment.

EXAMPLE

Next, operations of the debug systems according to the above exemplary embodiments will be described based on a specific example. In the present example, three information terminals are used. However, the number of information terminals may be extended to an arbitrary number.

In the present example, the debug stub server 11 and the program execution unit 13 are separated from each other as illustrated in FIG. 2. In addition, the debug stub server 11 is connected to the debug controllers 31a to 31c of the plurality of information terminals 20a to 20c via a network. In addition, the debug stub server 11 executes and controls debugging, forwards results, and communicates with the debug controllers 31a to 31c. In this way, debugging by the plurality of information terminals 20a to 20c is achieved.

In this example, the debug target apparatus 10 is debugged from the three information terminals 20a to 20c. The debug target apparatus 10 and the plurality of information terminals 20a to 20c are physically connected via Ethernet, USB, PCI, PCI Express, or serial communication, for example. Thus, data can be exchanged between the debug target apparatus 10 and the plurality of information terminals 20a to 20c.

Before starting debugging, for example, compiling by command CC using "-g" command enabling debugging with dbx command of C language of UNIX is executed to prepare an executable debug program (step S11 in FIG. 3). In this case, commands such as for profile acquisition, coverage acquisition, automatic testing, and memory management state examination can be executed.

In addition, test data for executing debugging and debug data are prepared (step S12). These data may be generated by the information terminals 20a to 20c or the debug target apparatus 10. Alternatively, these data may be generated by another apparatus other than the information terminals 20a to 20c and the debug target apparatus 10.

After the preparation in steps S11 and S12, the debug controllers 31a to 31c and the debug screens 32a to 32c are started on the respective information terminals 20a to 20c (step S31). In addition, the debug stub server 11 is started on the debug target apparatus 10 (step S32). The debug controllers 31a to 31c may be configured to be started simultaneously when the debug screens 32a to 32c are started.

Next, an instruction for starting the debug program 71 is outputted from the debug screen 32a of the information terminal 20a, from among the plurality of information terminals 20a to 20c (step S14).

When receiving the start instruction via the debug controller 31a and the debug stub server 11, the program execution unit 13 starts the debug program 71 (step S15).

If a plurality of control instructions exist when the debug program 71 is started, the debug stub server 11 executes exclusive control determination, specifies only the simultaneously executable control instructions as options, and displays the other control operations on the debug screens 32a to 32c as errors (step S45 in FIG. 4).

In contrast, on the debug screens 32a to 32c of the information terminals 20a to 20c, if a plurality of control instructions exist when the debug program 71 is operated, the debug stub server 11 executes exclusive control determination, specifies only the simultaneously executable control instructions as options, and displays the other control instructions on the debug screens 32a to 32c as errors (step S17 in FIG. 3).

Next, for example, debugging is continued until debugging is ended, while the debug program 71 with control repeats control such as stopping and restarting. The debug result is displayed on the debug screens 32a to 32c (steps S18 to S20). While addition or deletion of control instructions is executed, debugging is repeated until an instruction for ending debugging is outputted (step S21).

Figure 6:
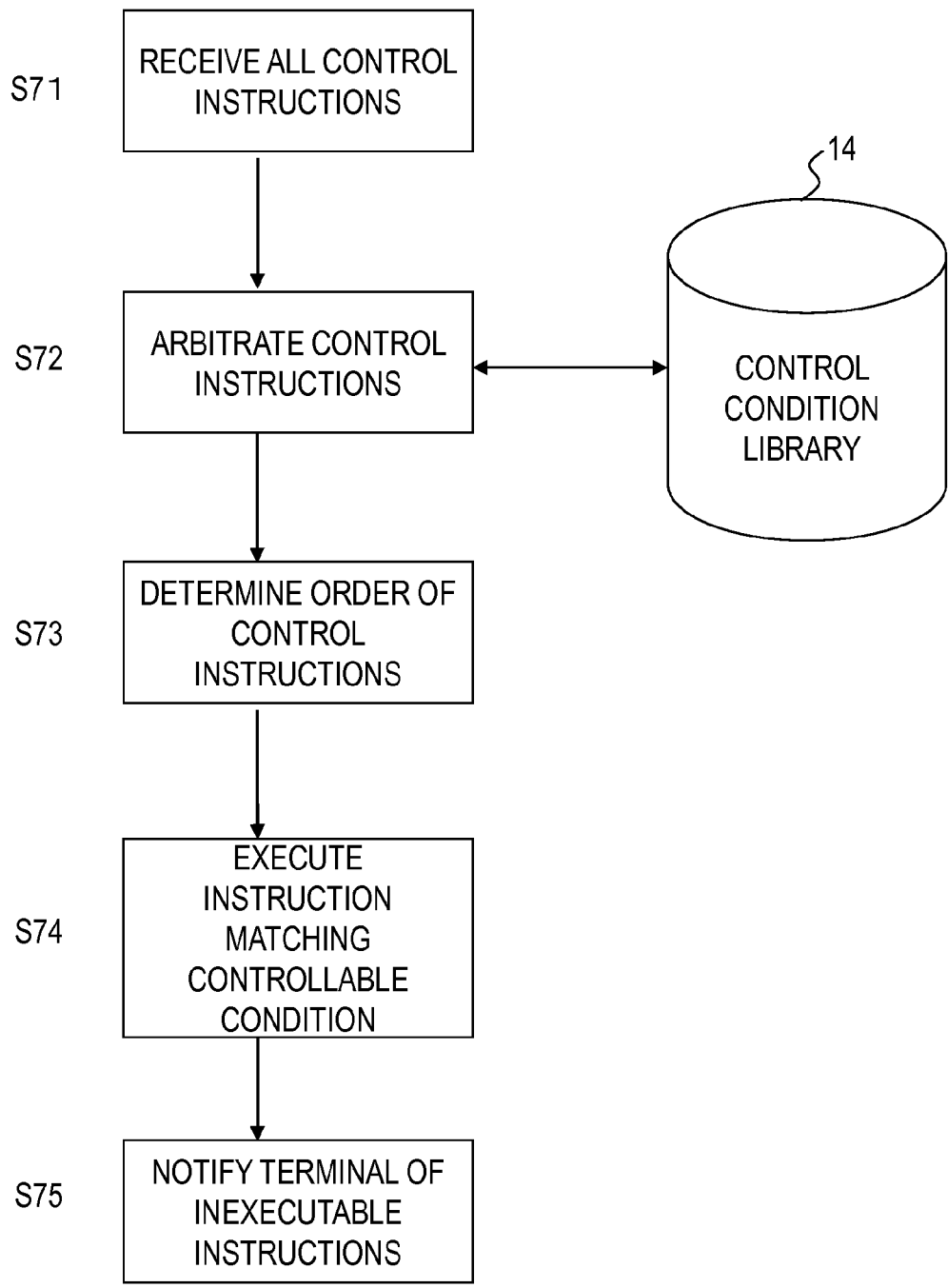
FIG. 6 is a flow chart illustrating an operation of a debug stub server according to an example.

FIG. 6 is a flow chart illustrating a method for determining exclusivity of control instructions by the debug stub server 11. With reference to FIG. 6, the debug stub server 11 receives all control instructions (step S71).

Next, the debug stub server 11 determines executable processes and the order thereof, by using exclusivity of control instructions or priorities of processes described in the control condition library 14 (step S72).

The control condition library 14 stores priorities of processes, such as the order in which the debug stub server 11 has received control instructions, priorities of information terminals, and priorities of control instructions. The control condition library 14 may be arranged in an arbitrary place, as long as the debug stub server 11 can refer to the control condition library 14. As illustrated in FIG. 2, the control condition library 14 may be arranged on the debug target apparatus 10.

Detection of control instructions having exclusivity, determination of control instructions when there is exclusivity, and the order in which control instructions having exclusivity are processed are set in a predetermined method in the control condition library 14. For example, there is exclusivity between stopping and restarting. The debug stub server 11 determines which control instruction needs to be executed between stopping and restarting, based on a preset method, for example, based on the order in which the debug stub server 11 has received these control instructions or the order of numbers given to the information terminals.

Figure 7:
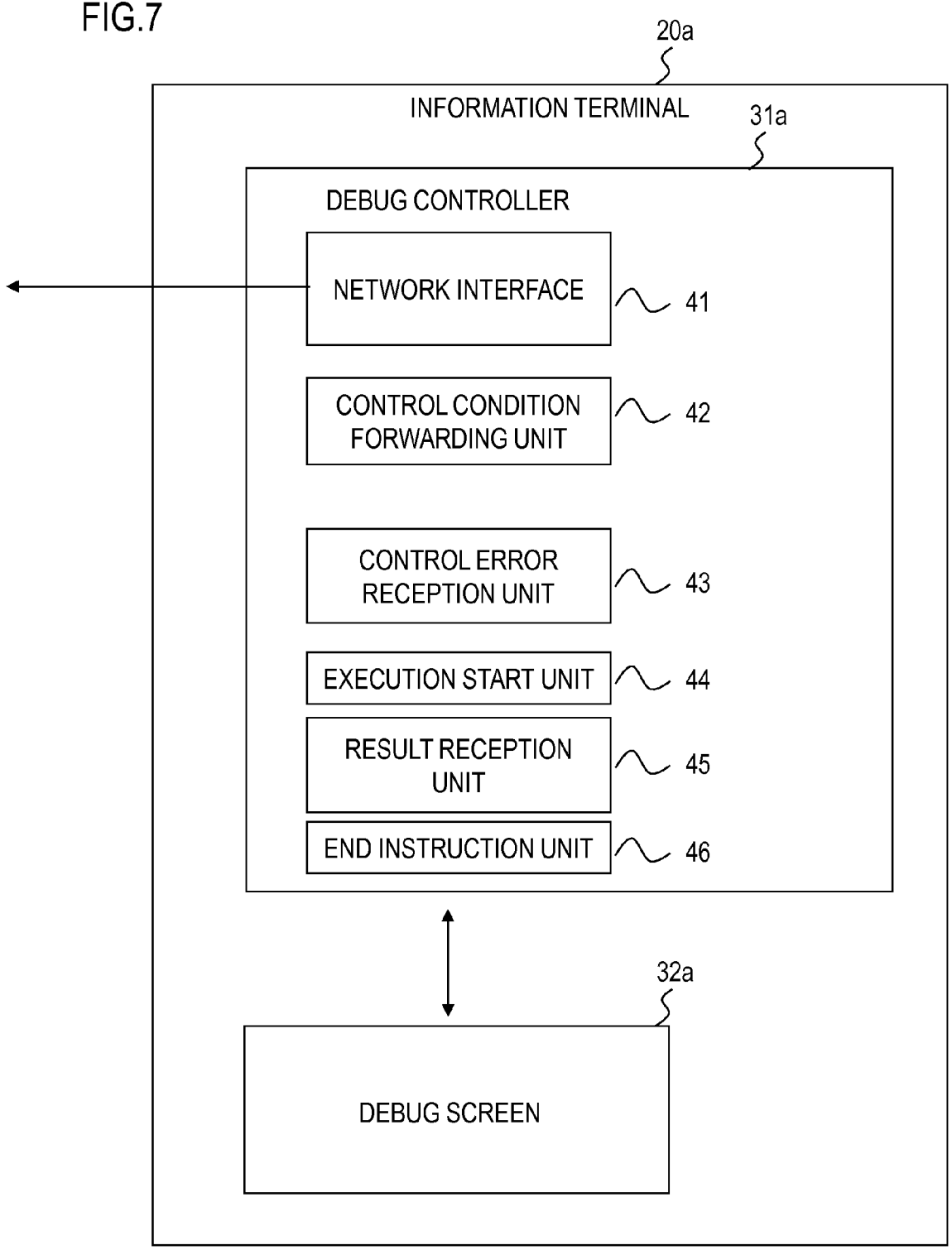
FIG. 7 is a block diagram illustrating a configuration of a debug controller in an information terminal according to the example.

To enable the debug stub server 11 to execute these processes, the debug controller 31a of the information terminal 20a includes the following configuration. FIG. 7 is a block diagram illustrating a configuration of the debug controller 31a of the information terminal 20a. With reference to FIG. 7, the debug controller 31a includes a network interface 41 communicating with the debug stub server 11, a control condition forwarding unit 42 forwarding a control condition, a control error reception unit 43 receiving a control error, an execution start unit 44, a result reception unit 45 receiving a debug result, and an end instruction unit 46.

Figure 8:
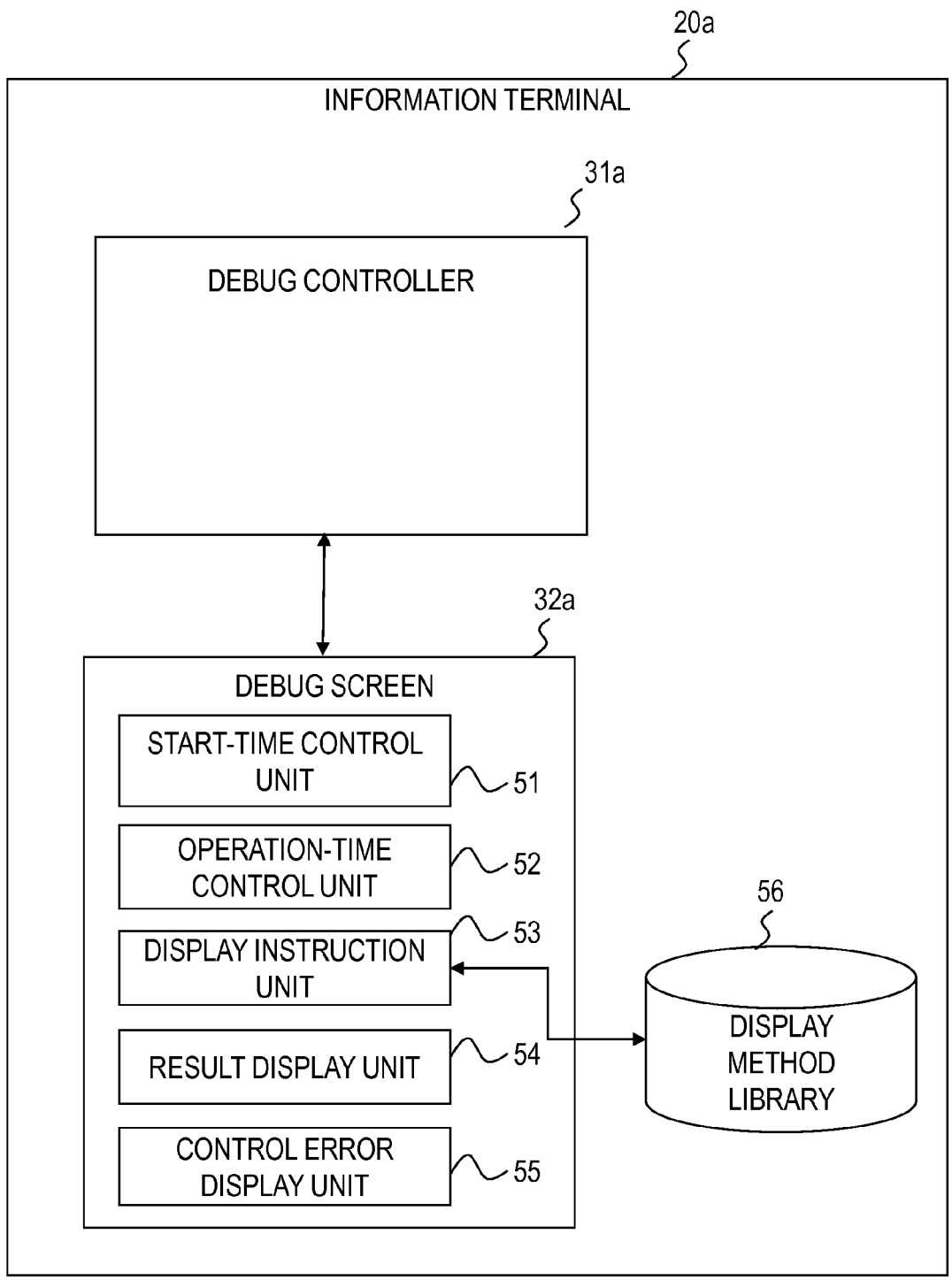
FIG. 8 is a block diagram illustrating a configuration of a debug screen in the information terminal according to the example.

FIG. 8 is a block diagram illustrating units of the information terminal 20a other than the units illustrated in FIG. 7. With reference to FIG. 8, the information terminal 20a further includes a display method library 56. In addition, the debug screen 32a includes a start-time control unit 51, an operation-time control unit 52, a display instruction unit 53 specifying a display method, a result display unit 54 displaying a debug result, and a control error display unit 55 displaying a control error.

The display method library 56 sets a display method. By using the display method library 56 and the display instruction unit 53, for example, a certain register can be displayed or hidden or the screen position and size can be changed for each debug screen.

Figure 9:
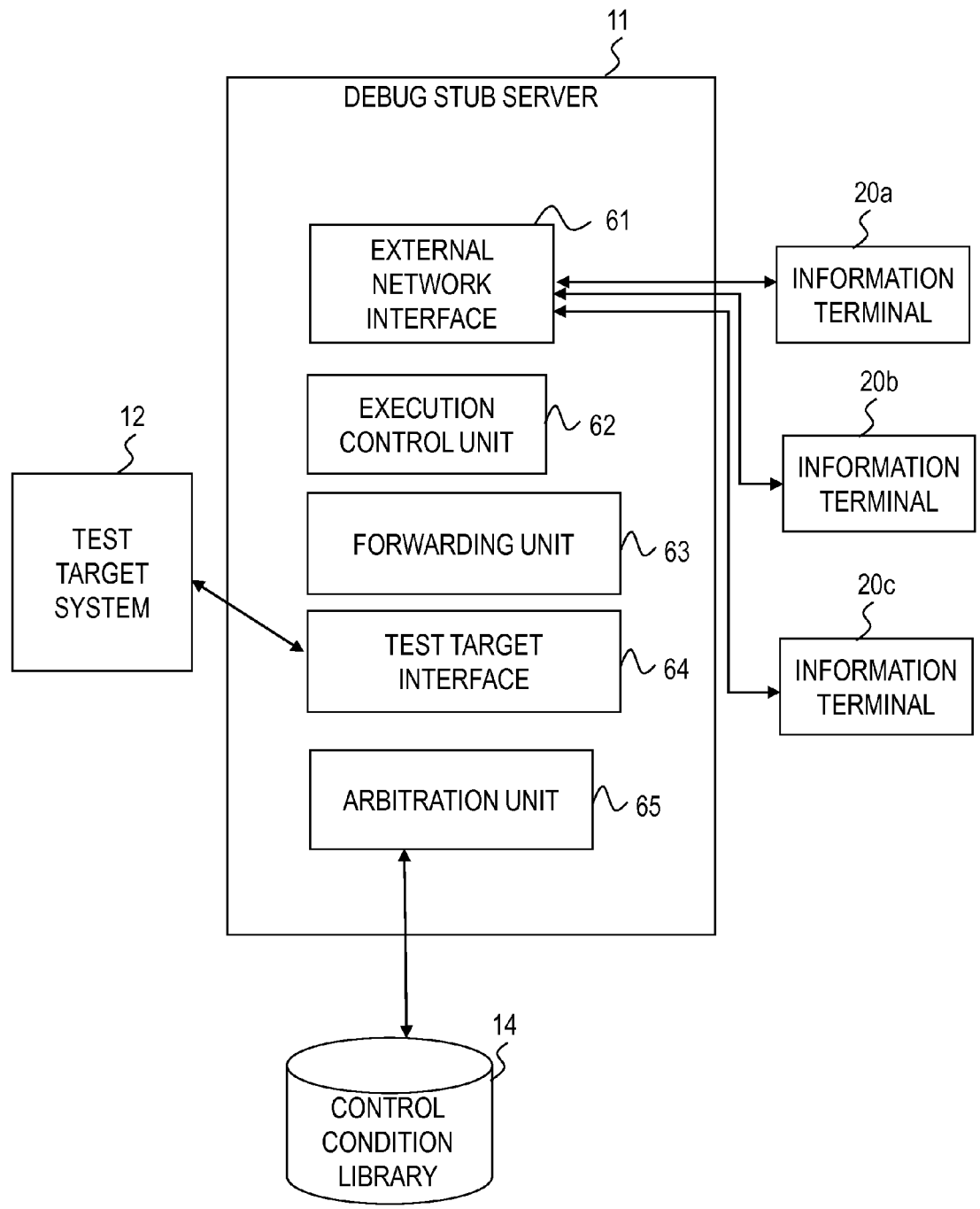
FIG. 9 is a block diagram illustrating a configuration of the debug stub server according to the example.
Figure 10:
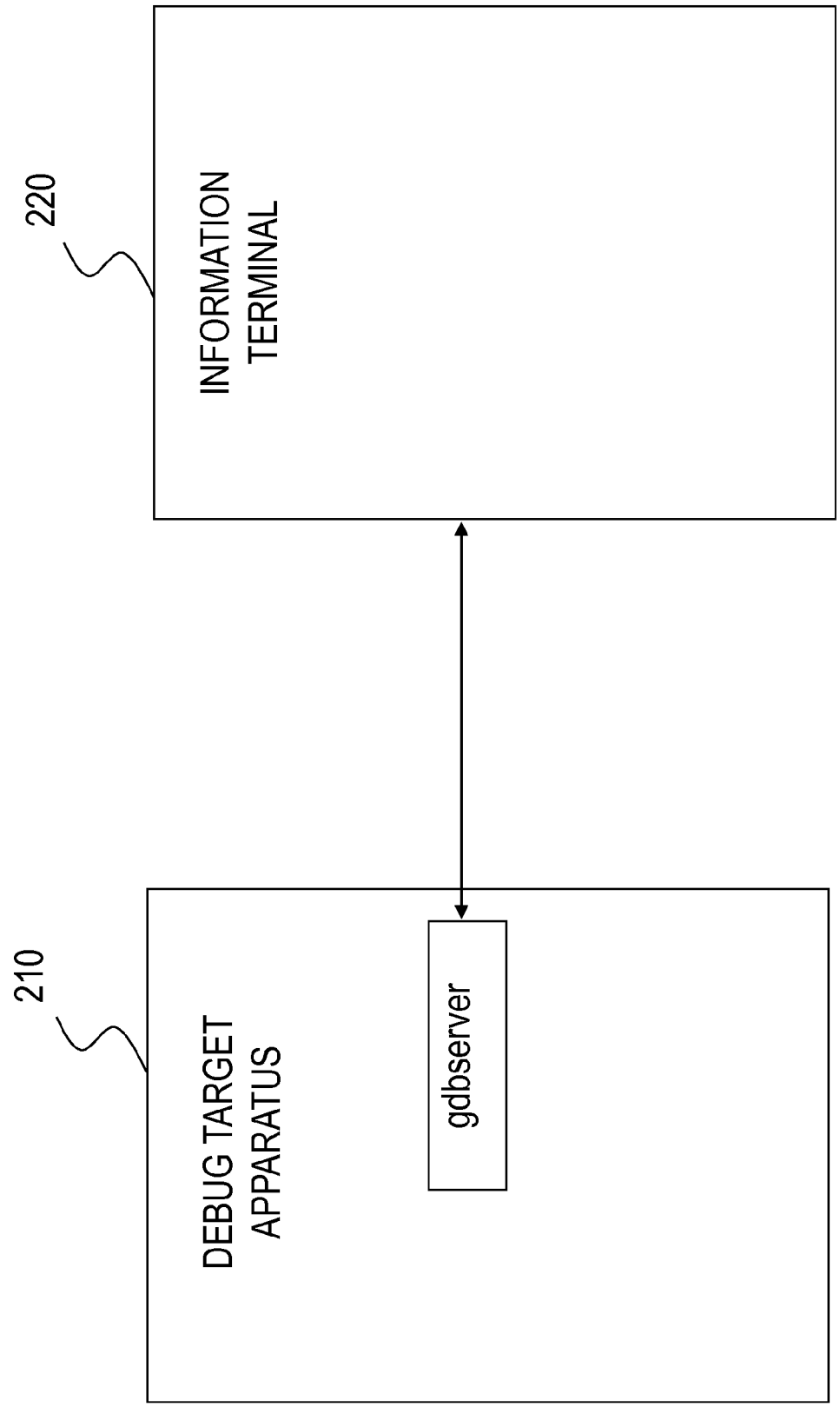
FIG. 10 is a block diagram illustrating a configuration of a debug system.
Figure 11:
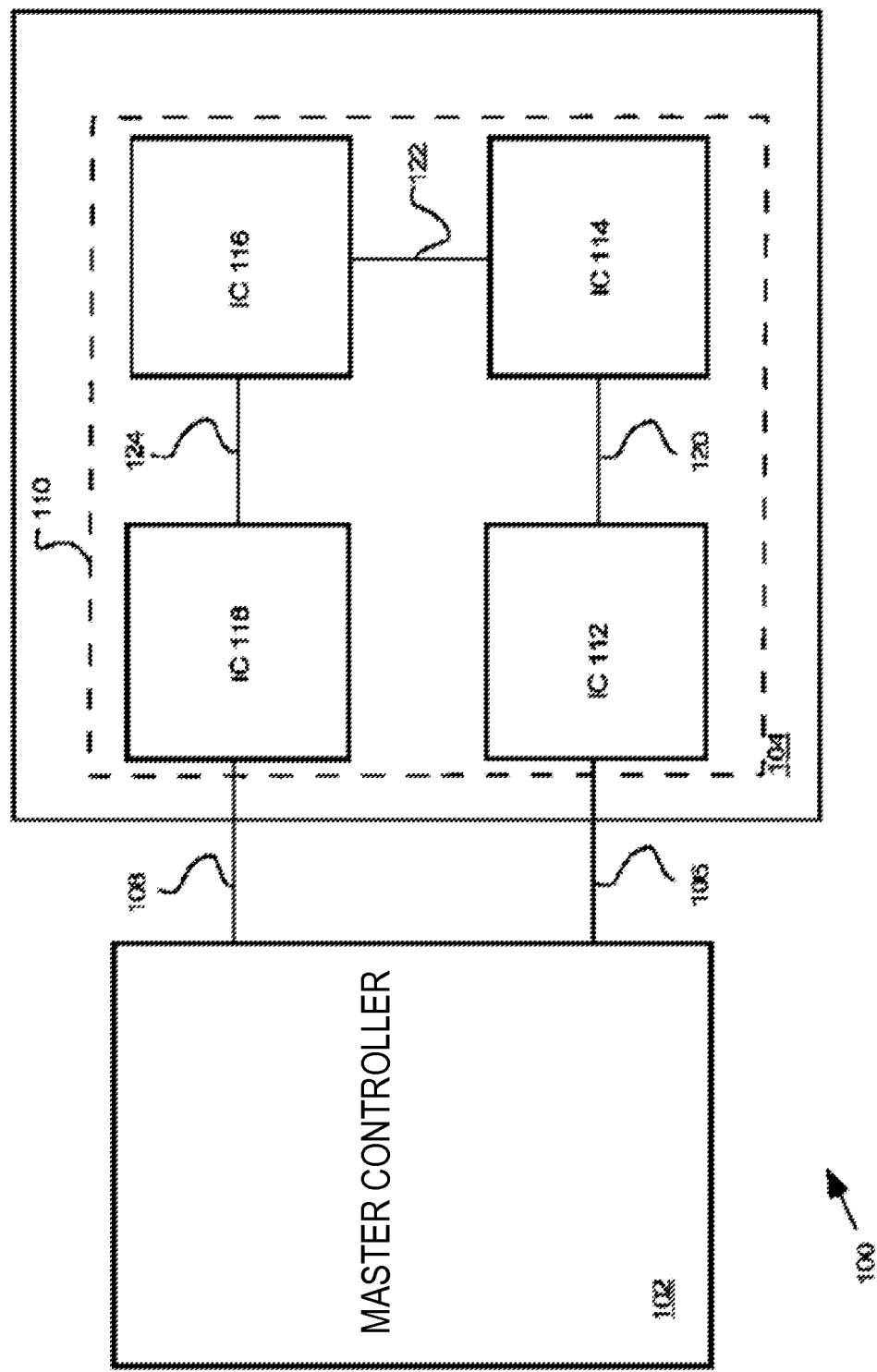
FIG. 11 is a block diagram illustrating a configuration of a test apparatus disclosed in PTL 1.

FIG. 9 is a block diagram illustrating a configuration of the debug stub server 11. With reference to FIG. 9, the debug stub server 11 includes an external network interface 61 communicating with the information terminal 20a, an execution control unit 62, a forwarding unit 63 forwarding data, programs, and results, a test target interface 64 communicating with the test target system 12, and an arbitration unit 65 determining the control order based on information from the control condition library 14.

If a plurality of processes are operated on the debug target apparatus 10, by using a method for starting an information terminal for each process, debugging from a plurality of information terminals can be achieved, as in the present example.

The debug system according to the present invention is applicable to an embedded system, a computer, a microprocessor, or a digital appliance. For example, the debug system is also applicable to testing, debugging, quality analysis, or performance analysis of a mobile phone LSI.

Modifications and adjustments of the exemplary embodiments and examples are possible within the scope of the overall disclosure (including the claims) of the present invention and based on the basic technical concept of the present invention. In addition, various combinations and selections of various disclosed elements (including the elements in each of the claims, examples, drawings, etc.) are possible within the scope of the claims of the present invention. That is, the present invention of course includes various variations and modifications that could be made by those skilled in the art according to the overall disclosure including the claims and the technical concept.

10 debug target apparatus
11 debug stub server
12 test target system
13 program execution unit
14 control condition library
16 arbitration unit
18 forwarding unit
20a to 20c information terminal
31a to 31c debug controller
32a to 32c debug screen
41 network interface
42 control condition forwarding unit
43 control error reception unit
44 execution start unit
45 result reception unit
46 end instruction unit
51 start-time control unit
52 operation-time control unit
53 display instruction unit
54 result display unit
55 control error display unit
56 display method library
61 external network interface
62 execution control unit
63 forwarding unit
64 test target interface
65 arbitration unit
71 debug program
72 debug execution data
100 test architecture
102 master controller
104 slave JTAG target
106, 108 JTAG connector
110 series register chain
120 to 124 boundary interconnection
210 debug target apparatus
220 information terminal
IC 112 to IC 118 integrated circuit

What is claimed is:

1. A debug stub server, comprising:
an arbitration unit that receives a plurality of control instructions given to a debug program from a plurality of information terminals, selects a simultaneously executable control instruction set from among the plurality of control instructions by arbitrating the plurality of control instructions, and forwards the selected control instruction set to the debug program; and
a forwarding unit that forwards a debug result obtained by the debug program based on the control instruction set selected by the arbitration unit to the plurality of information terminals,
wherein the arbitration unit notifies an information terminal that has transmitted a control instruction that has not been selected by the arbitration from among the plurality of control instructions that the control instruction has not been selected.

2. The debug stub server according to claim 1, wherein the arbitration unit arbitrates a plurality of received control instructions by referring to a control condition library that stores a rule for arbitrating the plurality of control instructions given to the debug program.

3. The debug stub server according to claim 1, wherein the arbitration unit arbitrates the plurality of control instructions given to the debug program based on at least one of priorities of the control instructions, numbers given to the information terminals that have transmitted the control instructions, and an order in which the arbitration unit has received the control instructions.

4. A debug system, comprising:
the debug stub server according to claim 1; and
a plurality of information terminals each of which is configured to transmit a control instruction given to the debug program from a user to the debug stub server and display a debug result forwarded from the debug stub server.

5. The debug system according to claim 4, wherein the debug stub server is arranged in a debug target apparatus executing the debug program or one of the plurality of information terminals.

6. The debug system according to claim 4, wherein each of the plurality of information terminals comprises:
a display method library that stores a method for displaying a debug result; and
a display instruction unit that displays the debug result based on the display method stored in the display method library.

7. A debug method, comprising:
by a debug stub server, receiving a plurality of control instructions given to a debug program from a plurality of information terminals;
selecting a simultaneously executable control instruction set from among the plurality of control instructions by arbitrating the plurality of control instructions;
forwarding the selected control instruction set to the debug program;
forwarding a debug result obtained by the debug program based on the selected control instruction set to the plurality of information terminals; and
by the debug stub server, notifying an information terminal that has transmitted a control instruction that has not been selected by the arbitration from among the plurality of control instructions that the control instruction has not been selected.

8. The debug method according to claim 7, wherein the debug stub server arbitrates a plurality of received control instructions by referring to a control condition library that stores a rule for arbitrating the plurality of control instructions given to the debug program.

9. The debug method according to claim 7, wherein the debug stub server arbitrates the plurality of control instructions given to the debug program based on at least one of priorities of the control instructions, numbers given to the information terminals that have transmitted the control instructions, and an order in which the debug stub server has received the control instructions.

10. A non-transitory computer-readable recording medium, storing a program that causes a computer to execute:
receiving a plurality of control instructions given to a debug program from a plurality of information terminals;
selecting a simultaneously executable control instruction set from among the plurality of control instructions by arbitrating the plurality of control instructions;
forwarding the selected control instruction set to the debug program;
forwarding a debug result obtained by the debug program based on the selected control instruction set to the plurality of information terminals; and
notifying an information terminal that has transmitted a control instruction that has not been selected by the arbitration from among the plurality of control instructions that the control instruction has not been selected.

11. The non-transitory computer-readable recording medium according to claim 10, wherein
the program causes the computer to execute:
arbitrating a plurality of received control instructions by referring to a control condition library that stores a rule for arbitrating the plurality of control instructions given to the debug program.

12. The non-transitory computer-readable recording medium according to claim 10, wherein
the program causes the computer to execute:
arbitrating the plurality of control instructions given to the debug program based on at least one of priorities of the control instructions, numbers given to the information terminals that have transmitted the control instructions, and an order in which the debug stub server has received the control instructions.

* * * * *